United States Patent [19]

Chang

[11] Patent Number: 5,020,390
[45] Date of Patent: Jun. 4, 1991

[54] LOCKING MECHANISM FOR AN AUTOMATIC SHIFTER BAR

[76] Inventor: Yu M. Chang, No. 148-98, Kuang Hua 1st Rd., Kaohsiung, Taiwan

[21] Appl. No.: 581,571

[22] Filed: Sep. 11, 1990

[51] Int. Cl.⁵ .................. B60R 25/06; F16P 1/00; B62D 1/06
[52] U.S. Cl. ........................ 74/608; 70/246; 70/202; 70/247; 74/557
[58] Field of Search ............ 74/606 R, 557, 528, 74/536, 543, 524, 523, 608, 612, 545; 70/245, 246, 247, 202, 203

[56] References Cited

U.S. PATENT DOCUMENTS

| | | | |
|---|---|---|---|
| 3,583,184 | 6/1971 | Papale | 70/247 |
| 3,710,606 | 1/1973 | Prince | 70/247 |
| 3,995,462 | 12/1976 | Boyle | 70/247 |
| 4,281,526 | 8/1981 | Lipschutz | 74/524 X |
| 4,541,257 | 9/1985 | Stoll | 70/247 |
| 4,693,099 | 9/1987 | Cykman | 70/202 |
| 4,759,424 | 7/1988 | Rolleri | 70/247 X |
| 4,791,795 | 12/1988 | Burgess et al. | 70/202 |
| 4,831,850 | 5/1989 | Wong et al. | 70/202 |
| 4,835,999 | 6/1989 | Chant | 70/238 |
| 4,858,451 | 8/1989 | Balina et al. | 70/202 |

FOREIGN PATENT DOCUMENTS

| | | | |
|---|---|---|---|
| 2445784 | 8/1980 | France | 70/247 |
| 203744 | 4/1966 | Sweden | 70/247 |
| 1102695 | 7/1981 | U.S.S.R. | 70/247 |
| 2142889 | 1/1985 | United Kingdom | 70/247 |
| 2152454 | 8/1985 | United Kingdom | 70/247 |

Primary Examiner—Vinh T. Luong
Attorney, Agent, or Firm—Irving M. Weiner; Robert M. Petrik; Joseph P. Carrier

[57] ABSTRACT

A locking device includes two caps for enclosing a head portion of an automatic shifter bar. A channel is formed in one cap and a block is provided on the other cap. The block which has one or more holes is engagable within the channel. A lock with a pin is provided above the channel. The caps are locked in a lock position when the lock is depressed downward so that the pin is engaged in either hole of the block and so that a press button of the automatic shifter bar can not be depressed and can not be operated.

1 Claim, 4 Drawing Sheets

LOCKING MECHANISM FOR AN AUTOMATIC SHIFTER BAR

FIELD OF THE INVENTION

The present invention relates to a locking mechanism, and more particularly to a locking mechanism for an automatic shifter bar.

BACKGROUND OF THE INVENTION

Automatic shifter bar usually comprises a button provided on an upper end thereof. The shifter bar can not be moved unless the button is depressed. As far as the applicant is aware, no lock mechanism is provided for locking the automatic shifter bar.

The present invention has arisen to provide a locking mechanism for automatic shifter bar.

SUMMARY OF THE INVENTION

The objective of the present invention is to provide a locking mechanism which locks an automatic shifter bar so that the automatic shifter bar can not be moved or operated when the locking mechanism is locked in position.

In accordance with one aspect of the invention, there is provided a locking device for an automatic shifter bar which includes a first cap and a second cap, each having an open end facing each other and each having a notch formed in a bottom plate. The caps are identical in shape, in which one cap has a smaller size than the other. A head portion of the automatic shifter bar is enclosable by the first cap and the second cap. A groove is laterally formed in a side wall of the first cap, and a channel is formed in another side wall of the first cap. A lock is provided on the channel. A pin is provided on a lower end of the lock and is insertable into the channel when the lock is depressed to a lock position. A protrusion is formed on an outer surface a side wall of the second cap and is arranged to be engaged in the groove of the first cap. A block is provided on an outer surface of another side wall of the second cap and is insertable into the channel of the first cap. A hole is formed in the block. The first cap and the second cap are locked in a lock position when the lock is depressed downward so that the pin is engaged in either of the holes of the block and so that a press button of the automatic shifter bar can not be depressed and can not be operated.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
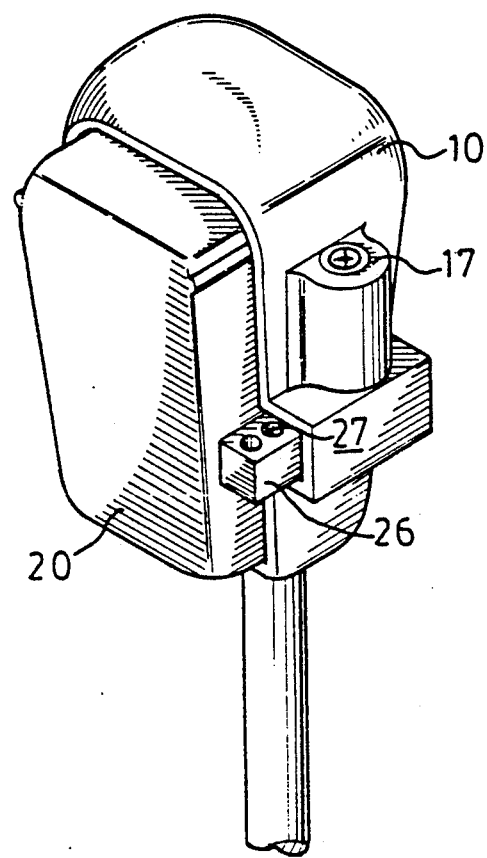
FIG. 1 is a perspective view of a locking mechanism for an automatic shifter bar in accordance with the present invention.
Figure 2:
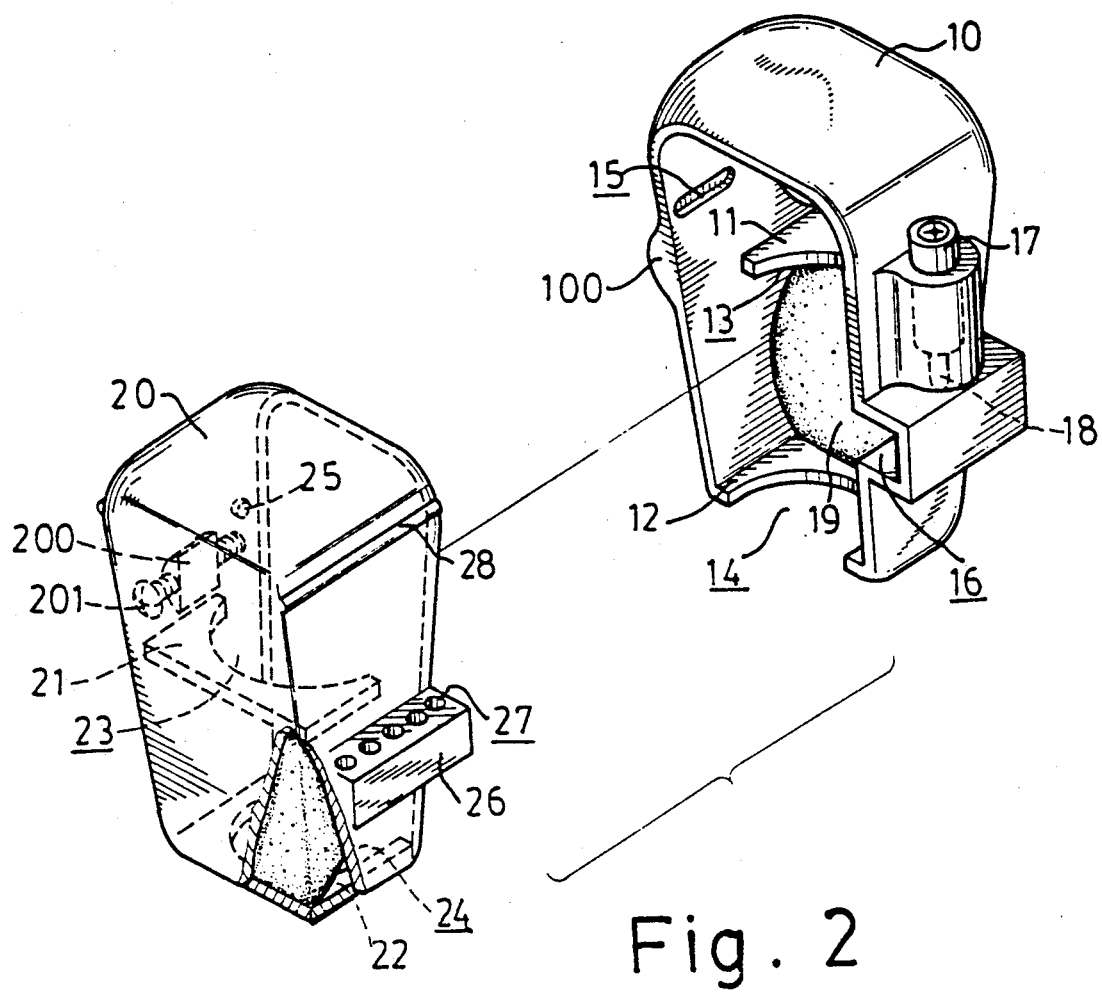
FIG. 2 is an exploded view of the locking mechanism.

Referring to the drawings and initially to FIGS. 1 and 2, a locking mechanism in accordance with the present invention comprises generally a first cap 10 and a second cap 20 provided for enclosing an upper end of an automatic shifter bar 82 so that the automatic shifter bar can not be moved or operated when the locking mechanism is locked in position.

The first cap 10 and the second cap 20 are substantially identical in shape except that the second cap 20 has a smaller size than that of the first cap 10. The first cap 10 and the second cap 20 each has an open end facing each other, and has a partition plate 11, 21 formed in a middle portion thereof. A recess 13, 23 is formed in the respective partition plate 11, 21. A notch 14, 24 is formed in the respective bottom plate 12, 22. A groove 15 is laterally formed in a side wall of the first cap 10, and a lump 100 is formed on the outer surface of the side wall. A channel 16 which is substantially rectangular is laterally formed in the other side wall of the first cap 10. A lock 17 is disposed upon the channel 16. The lock 17 is a press type lock, i.e., when a key (not shown) is inserted into the key hole and is pressed downward to a lock position, a pin 18 will also be pressed downward into the channel 16 to catch a female element which will be described hereinafter. The press type lock 17 is commercially available and will not be described with further details. A pad 19, 29 (FIG. 3) is provided in the inner surface of the respective cap 10, 20.

A protrusion 25 is formed on an outer surface of a side wall of the second cap 20 and is arranged to be slidably engaged in the groove 15 of the first cap 10. A block 26 which is substantially rectangular is integrally formed on an outer surface of the other side wall of the second cap 20 and is arranged to be engaged in the channel 16 of the first cap 10. Four holes 27 are formed in the upper surface of the block 26 so that the block 26 is formed as the female element to receive the pin 18. The pin 19 is engagable with either hole 27 when the lock 17 is pressed downward to a lock position. A pair of ribs 28 are formed on the upper portion of the side walls of the second cap 20. A projection 200 is formed on an outer surface of the side wall opposite to the block 26. A bolt 201 is threaddedly engaged in the projection 200. The free end of the bolt 201 is caused to contact the front surface of the lump 100 when the first cap 10 and the second cap 20 are coupled together so that the relative position between the bolt 201 and the projection 200 is controlled by a rotation of the bolt 201 relative to the projection 200. The relative position between one side of the first cap 10 and the second cap 20 is controlled by a relative position between the bolt 201 and the projection 200.

Figure 3:
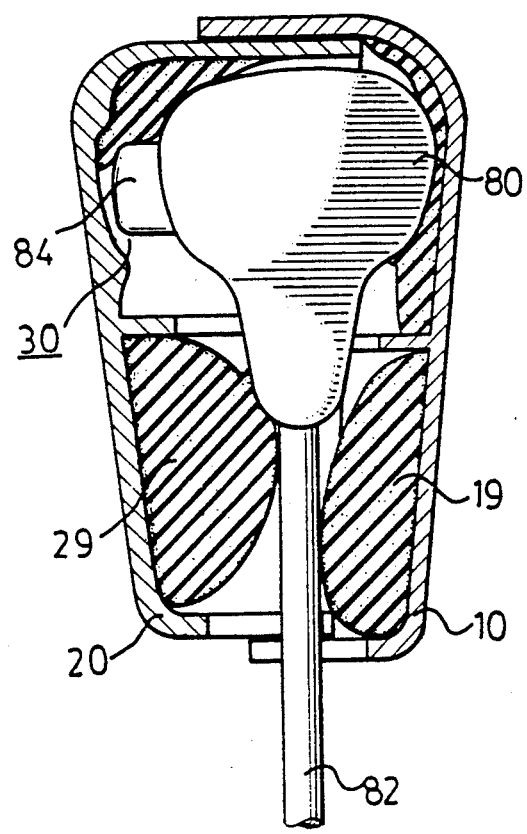
FIGS. 3 and 4 are cross sectional views taken along line 3—3 embodying the present invention, in which two types of shifter bars are used.

Referring next to FIG. 3, when the open end portion of the second cap 20 is inserted into the open end portion of the first cap 10, a head portion 80 of an automatic shifter bar 82 is enclosed in and between the two caps 10, 20, and the block 26 is inserted into the channel 16. When the lock 17 is depressed downward to a lock position, the pin 19 is depressed downward to engage with either hole 27 of the block so that the two caps 10, 20 are locked in a lock position. The pads 19, 29 prevent the head 80 of the automatic shifter bar 82 from direct contacting the inner surfaces of the two caps 10, 20. It is to be noted that a depression 30 is formed in the upper portion of the second cap 20 for accommodating the press button 84 of the automatic shifter bar 82 so that the press button 84 is well protected by the second cap 20 and will not be depressed.

Figure 4:
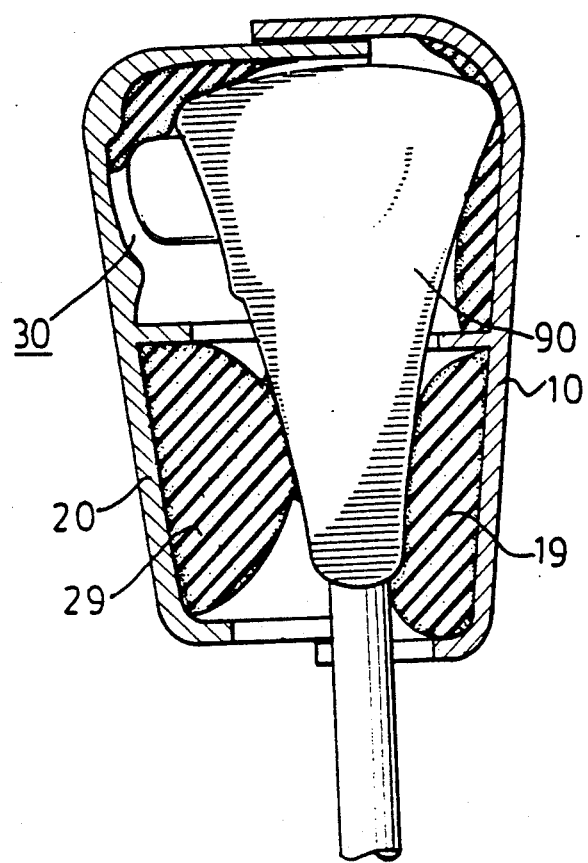

Referring next to FIG. 4, the head 90 of another automatic shifter bar, as shown, has a larger size and has a different shape as compared with the head 80 as shown in FIG. 3. It is to be noted that the sizes of the recesses 13, 23 are selected as large as possible according to the head of the automatic shifter bar which has a largest size so that the two caps 10, 20 are also suitable for locking the head 90 which has a larger size.

Accordingly, the locking mechanism in accordance with the present invention can lock the head portion of the automatic shifter bar so that, when the lock is locked in the lock position, the press button of the automatic shifter bar can not be pressed and can not be operated unless authorized.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A locking mechanism for an automatic shifter bar comprising a first cap and a second cap, each having an open end facing each other and each having a notch formed in a bottom plate thereof, said first cap and said second cap being substantially identical in shape, said second cap having a smaller size than that of said first cap, a head portion of said automatic shifter bar being enclosable by said first cap and said second cap, a groove being laterally formed in a side wall of said first cap, a channel being formed in another side wall of said first cap, a lock being provided on said channel, a pin being provided on a lower end of said lock, said pin being insertable into said channel when said lock is depressed to a lock position, a protrusion being formed on an outer surface of a side wall of said second cap and being arranged to be engaged in said groove of said first cap, a block being provided on an outer surface of another side wall of said second cap and being insertable into said channel of said first cap, at least one hole being formed in an upper surface of said block, and said first cap and said second cap being locked in a lock position when said lock is depressed downward so that said pin is engaged in either hole of said block, and so that a press button of said automatic shifter bar can not be depressed and so that said automatic shifter bar can not be operated.

* * * * *